(12) United States Patent
Otanez et al.

(10) Patent No.: US 8,965,650 B1
(45) Date of Patent: Feb. 24, 2015

(54) SYSTEM AND METHOD FOR CONTROLLING AN AUTOMATIC TRANSMISSION

(71) Applicant: GM Global Technology Operations LLC, Detroit, MI (US)

(72) Inventors: Paul Otanez, Troy, MI (US); Randall B. Dlugoss, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/053,115

(22) Filed: Oct. 14, 2013

(51) Int. Cl.
  *G06F 7/00* (2006.01)
  *B60W 20/00* (2006.01)
  *B60W 10/11* (2012.01)

(52) U.S. Cl.
  CPC ............... *B60W 20/30* (2013.01); *B60W 10/11* (2013.01); *Y10S 903/902* (2013.01)
  USPC ................................. 701/67; 701/22; 903/902

(58) Field of Classification Search
  USPC ...................................................... 701/22, 67
  See application file for complete search history.

(56) References Cited

U.S. PATENT DOCUMENTS

| 5,902,344 | A  | * | 5/1999  | Eike et al.     | 701/67    |
|-----------|----|---|---------|-----------------|-----------|
| 6,672,990 | B2 | * | 1/2004  | Netzer          | 477/156   |
| 2004/0209737 | A1 | * | 10/2004 | Lee          | 477/174   |
| 2008/0217134 | A1 | * | 9/2008  | Popp et al.  | 192/85 R  |
| 2009/0159389 | A1 | * | 6/2009  | Imediegwu    | 192/3.58  |
| 2011/0251767 | A1 | * | 10/2011 | Tsutsui et al.| 701/67   |
| 2012/0067690 | A1 | * | 3/2012  | Postic et al.| 192/85.63 |
| 2013/0045835 | A1 | * | 2/2013  | Schang et al.| 477/78   |
| 2013/0324350 | A1 | * | 12/2013 | Meyer et al. | 475/280  |

* cited by examiner

*Primary Examiner* — Hussein A. Elchanti
(74) *Attorney, Agent, or Firm* — Quinn Law Group, PLLC

(57) ABSTRACT

The method can control an automatic transmission and includes the following steps: (a) determining, via a controller, an initial gear ratio of the automatic transmission based on a gear shift map while the vehicle is solely driven by an electric motor-generator; (b) identifying a plurality of potential clutches of the automatic transmission based on the initial gear ratio; (c) determining a temperature of a transmission fluid; (d) determining which of the potential clutches has a largest fill time in order to identify at least one of a plurality of target clutches; (e) determining, via the controller, a target gear ratio of the automatic transmission based on at least one identified target clutch; (f) transferring sufficient transmission fluid to at least one identified target clutch to reach a pressure threshold in the target clutches.

20 Claims, 3 Drawing Sheets

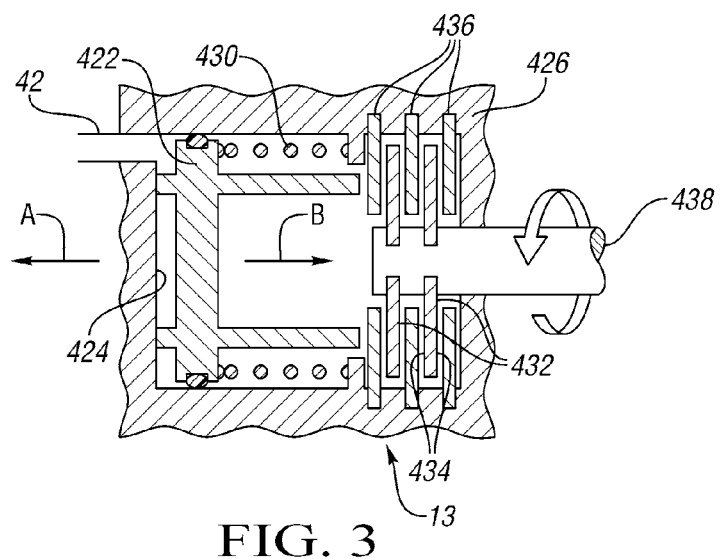
FIG. 3
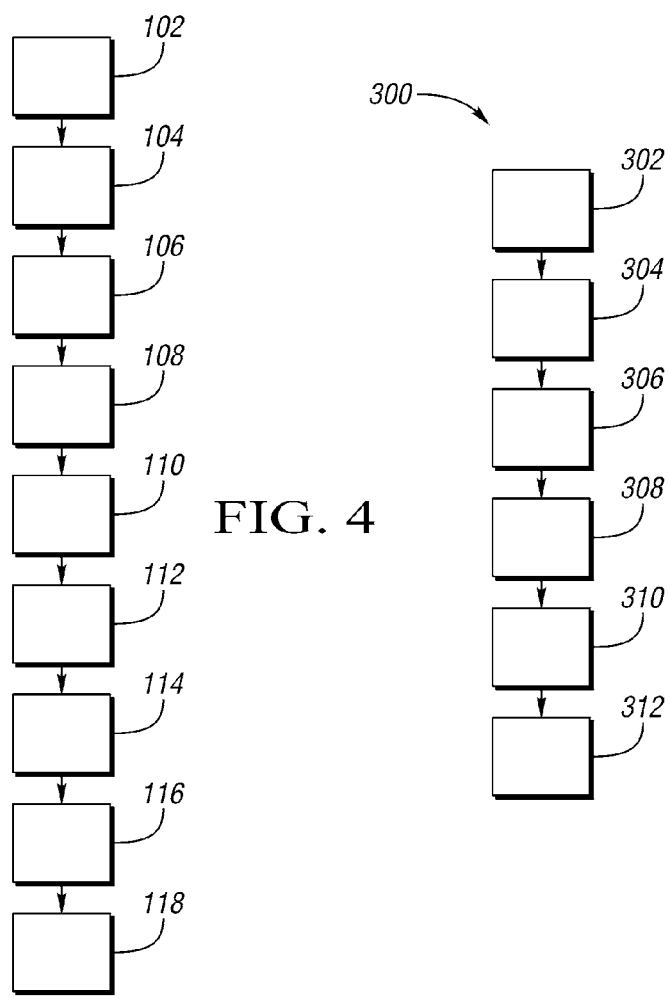
FIG. 4
FIG. 6

SYSTEM AND METHOD FOR CONTROLLING AN AUTOMATIC TRANSMISSION

TECHNICAL FIELD

The present disclosure relates to a system and method for controlling an automatic transmission.

BACKGROUND

A hybrid vehicle may include an automatic transmission, an internal combustion engine, and an electric motor. Accordingly, the vehicle can be propelled by the internal combustion engine, the electric motor, or both. Sometimes, the vehicle may be solely driven by the electric motor. At some point, however, the vehicle operator may request additional torque while the vehicle is being propelled by the electric motor. The vehicle operator may request additional torque by, for example, pressing an accelerator pedal. In response to this torque request by the vehicle operator, the internal combustion engine may start while the vehicle is being propelled by the electric motor. Such engine start is referred to as a flying engine start. The term "flying engine start" therefore means a process in which the internal combustion engine of a vehicle starts while the vehicle is being solely driven by one or more electric motors.

SUMMARY

It is useful to minimize the time it takes to transfer torque from an internal combustion engine to an axle of a vehicle during a flying engine start. Because an automatic transmission operatively couples the internal combustion engine to the axle of the vehicle, the automatic transmission may be controlled in order to minimize the time it takes to transfer torque from the internal combustion engine to the axle of the vehicle during a flying engine start.

The present disclosure relates to a method for controlling an automatic transmission in order to minimize the time it takes to transfer torque from an internal combustion engine to the axle of the vehicle during a flying engine start. In an embodiment, the method can control the automatic transmission of a vehicle. The vehicle includes a controller, an internal combustion engine operatively coupled to the automatic transmission, an axle operatively coupled to the automatic transmission, and an electric motor-generator. In an embodiment, the method includes determining, via the controller, an initial gear ratio of the automatic transmission based on a gear shift map while the vehicle is solely driven by the electric motor-generator, and identifying a plurality of potential clutches of the automatic transmission based on the initial gear ratio. Each of the potential clutches is configured to shift between a disengaged state and an engaged state. Each of the potential clutches has a fill time. As used herein, the term "fill time" means the amount of time it takes a clutch to reach a threshold. This threshold may be based at least in part on piston position, clutch volume, and/or clutch pressure. As a non-limiting example, the term "fill time" may refer to the amount of time required to fill a clutch with transmission fluid in order to shift that clutch from the disengaged state to the engaged state. The method further includes determining the temperature of the transmission fluid, and determining which of the potential clutches has a largest fill time in order to identify at least one of a plurality target clutches. Moreover, the method includes determining, via the controller, a target gear ratio of the automatic transmission based on at least one identified target clutch, and transferring sufficient transmission to at least one identified target clutch to reach a pressure threshold in the at least one identified target clutch in order to minimize a time necessary to transfer torque from the internal combustion engine to the axle through the automatic transmission once the internal combustion engine is started.

The present disclosure relates to a system for controlling an automatic transmission in order to minimize the time it takes to transfer torque from an internal combustion engine to the axle of the vehicle during a flying engine start. The system can be used to control the automatic transmission of a vehicle. The vehicle includes an internal combustion engine operatively coupled to the automatic transmission, an axle operatively coupled to the automatic transmission, and an electric motor-generator. The automatic transmission includes a plurality of clutches. In an embodiment, the system includes a pressure source and a plurality of valves. Each valve is in fluid communication with the pressure source and at least one of the clutches. The system further includes a controller in electronic communication with the pressure source and the plurality of valves. The controller is configured and programmed to determine an initial gear ratio of the automatic transmission based on a gear shift map while the vehicle is solely driven by the electric motor-generator, and identify potential clutches of the plurality of clutches based on the initial gear ratio. Each of the potential clutches is configured to shift between a disengaged state and an engaged state. Further, each of the potential clutches has a fill time. As discussed above, the term "fill time" means the amount of time it takes a clutch to reach a threshold. This threshold may be based at least in part on piston position, clutch volume, and/or clutch pressure. As a non-limiting example, the term "fill time" may refer to the amount of time required to fill a clutch with transmission fluid in order to shift that clutch from the disengaged state to the engaged state. The controller is also configured and programmed to determine the temperature of the transmission fluid, and determine which of the potential clutches has a largest fill time in order to identify at least one of a plurality of target clutches. Moreover, the controller is configured and programmed to determine a target gear ratio of the automatic transmission based on at least one identified target clutch, and send an activation command to the pressure source to turn on the pressure source. Further, the controller is configured and programmed to send pressure commands to the valves that are in fluid communication with the potential clutches used to select the target gear ratio in order to transfer sufficient transmission fluid to at least one identified target clutch to reach a pressure threshold in at least one identified target clutch to thereby minimize a time necessary to transfer torque from the internal combustion engine to the axle through the automatic transmission once the internal combustion engine is started.

The present disclosure also relates to a vehicle such as a car or truck. In an embodiment, the vehicle includes an automatic transmission including a plurality clutches. Each of the clutches is configured to shift between a disengaged state and an engaged state. Each of the clutches has a fill time. As discussed above, the term "fill time" means the amount of time it takes a clutch to reach a threshold. This threshold may be based at least in part on piston position, clutch volume, and/or clutch pressure. As a non-limiting example, the term "fill time" may refer to the amount of time required to fill a clutch with transmission fluid in order to shift that clutch from the disengaged state to the engaged state. The vehicle further includes an internal combustion engine operatively coupled to the automatic transmission and a first axle operatively coupled to the internal combustion engine and the automatic transmission. The vehicle further includes a second axle and an electric motor-generator operatively coupled to the second axle. Further, the vehicle includes a pressure source in fluid communication with the plurality of clutches. Moreover, the vehicle includes a plurality of valves. Each valve is in fluid communication with the pressure source and at least one of the clutches. The vehicle further includes a controller in electronic communication with the pressure source and the plurality of valves. The controller is configured and programmed to determine an initial gear ratio of the transmission based on a gear shift map while the vehicle is solely driven by the electric motor-generator. Further, the controller is configured and programmed to identify potential clutches of the plurality of clutches based on the initial gear ratio. Moreover, the controller is configured to determine a temperature of a transmission fluid and determine which of the potential clutches has a largest fill time in order to identify at least one of a plurality of target clutches. The controller is configured and programmed to determine a target gear ratio of the transmission based on at least one identified target clutch and send an activation command to the pressure source to turn on the pressure source. Furthermore, the controller is configured and programmed to send pressure commands to the valves that are in fluid communication with the potential clutches used to select the target gear ratio in order to transfer sufficient transmission fluid to at least one identified target clutches to reach a pressure threshold in at least one identified target clutch to thereby minimize a time necessary to transfer torque from the internal combustion engine to the first axle through the automatic transmission once the internal combustion engine is started.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 3 is a schematic sectional view of a hydraulic clutch;

FIG. 4 is a flowchart illustrating a method of controlling an automatic transmission;

FIG. 6 is a flowchart illustrating sub-steps of the method illustrated in FIG. 4.

DETAILED DESCRIPTION

Figure 1:
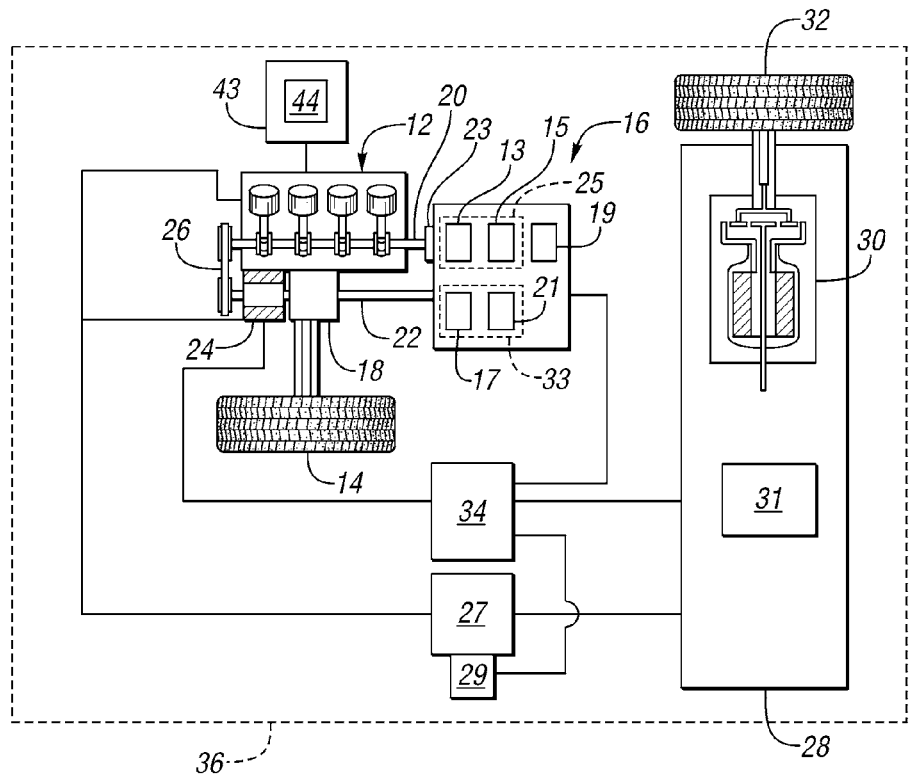
FIG. 1 is a schematic block diagram of an electric hybrid vehicle.

Referring to the drawings in which like elements are identified with identical numerals throughout, FIG. 1 illustrates a hybrid vehicle 36 equipped with an electric all-wheel drive system. The vehicle 36 includes an internal combustion engine 12 configured to drive the vehicle 36. Specifically, the vehicle 36 includes a first set of wheels 14 and a first axle 18 operatively coupling the internal combustion engine 12 to the first set of wheels 14. In addition to the first set of wheels 14, the vehicle 36 includes an automatic transmission 16 operatively interconnecting the first axle 18 and the internal combustion engine 12. Thus, the internal combustion engine 12 is operatively coupled to the first axle 18 via the automatic transmission 16.

The automatic transmission 16 includes an input member 20, such as an input shaft, and an output member 22, such as an output shaft, and can transfer torque from the internal combustion engine 12 to the first axle 18 at a certain speed ratio. The term "speed ratio" means the ratio of the angular velocity of the input member 20 to the angular velocity of the output member 22. If the automatic transmission 16 includes a gear train, the speed ratio may be referred to as the gear ratio. For example, the automatic transmission 16 may be a multi-speed automatically-shiftable transmission that utilizes a gear train and multiple torque transmitting devices to generate discrete gear ratios between an input member 20 and an output member 22 of the transmission 16. The output member 22 is operatively coupled to the first axle 18, while the input member 20 is operatively coupled to the internal combustion engine 12. Accordingly, the automatic transmission 16 is operatively coupled between the internal combustion engine 12 and the first axle 18. Hence, the automatic transmission 16 is configured to transfer torque from the internal combustion engine 12 to the first axle 18.

The automatic transmission 16 may include various gear trains, planetary gear sets, and torque transmitting devices, such as clutches and/or brakes. In the depicted embodiment, the automatic transmission 16 may include first, second, third and fourth clutches 13, 15, 17, 21 using pressurized transmission fluid 51 (FIG. 21) supplied by a pressure source 23 (see also FIGS. 3 and 4). The transmission fluid 51 may be a hydraulic fluid such as oil. As used herein, the term "clutch" refers to any type of friction torque transfer device including, without limitation, hydraulically-applied rotating friction clutches, single or compound plate clutches or packs, band clutches, and brakes or any suitable friction clutch. Although the drawings illustrate four clutches, it is envisioned that the automatic transmission 16 may include more or fewer clutches. The term "pressure source" refers to a device capable of pressurizing transmission fluid. As a non-limiting example, the pressure source 23 may be a pump such as an auxiliary hydraulic pump. The pressure source 23 may be operatively connected to the transmission 16 and is disposed in fluid communication with the first, second, third, and fourth clutches 13, 15, 17, and 21. Further, the pressure source 23 can receive electrical energy from an energy storage device 27 and can be selectively turned on and off. During operation, the pressure source 23 generates fluid pressure to apply to the first, second, third, and fourth clutches 13, 15, 17, 21.

The automatic transmission 16 may be a type that includes at least one specific gear ratio that requires full engagement or lock-up of a plurality of torque transmitting devices (e.g., first, second, third, and fourth clutches 13, 15, 17, 21) in order to select the subject gear ratio and complete a desired gear shift. For example, to select a specific gear ratio, such as a first gear ratio, a first group of clutches 25 can be fully applied. In the depicted embodiment, the first group of clutches 25 includes the first and second clutches 13 and 15. However, it is envisioned that the first group of clutches 25 may include other clutches. Similarly, to select another specific gear ratio, such as a second gear ratio, a second group of clutches 33 should be fully applied. In the embodiment shown in FIG. 1, the second group of clutches 33 includes the third and fourth clutches 17 and 21. It is nevertheless contemplated that the second group of clutches 33 may include other clutches. Different combinations of clutches may be fully applied to select different gear ratios in the automatic transmission 16. The term "gear ratio" may also be referred to as "gear state."

The automatic transmission 16 may include a temperature sensor 19 for determining the temperature of the automatic transmission fluid (ATF) in the transmission 16. The temperature sensor 19 may be a thermistor and can send a signal to a controller 34 indicative of the temperature of the ATF in the transmission 16.

The vehicle 36 also includes a first electric motor-generator 24. In the example embodiment, the first motor-generator 24 may be configured as an integrated starter-generator (ISG) or a 12 volt stop-start motor. The ISG contemplated herein is a 36 volt or greater motor-generator that is connected directly to the engine 12 via a belt 26 and receives its electrical energy from an energy storage device 27, such as one or more batteries. As shown, the first motor-generator 24 is used for quickly starting and spinning the engine 12 up to operating speeds as part of an engine stop-start arrangement. Additionally, the first motor-generator 24 may be used for generating electrical energy for use by accessories (not shown) of the vehicle 36, such as power steering and a heating, ventilation and air conditioning (HVAC) system.

The vehicle 36 additionally includes a second axle 28. The second axle 28 may be driven without the aid of the engine 12, transmission 16, and first motor-generator 24. The second axle 28 includes a second electric motor-generator 30 that is configured to drive the vehicle 36 via a second set of wheels 32. The second motor-generator 30 receives its electrical energy from the energy storage device 27. Accordingly, the second motor-generator 30 is configured to drive the vehicle 36 without the aid of the engine 12 and provides the vehicle 36 with an on-demand electric axle drive. When the vehicle 36 is driven solely via the second motor-generator 30, the vehicle 36 is operated in a purely electric vehicle or "EV" mode. Furthermore, when both first and second axles 18, 28 are driven by their respective power sources, the engine 12 and the second motor-generator 30, the vehicle 36 is in an all-wheel drive (AWD) mode.

The vehicle 36 may be driven solely by the second motor-generator 30 while the engine 12 is shut off and the transmission 16 is placed in neutral in order to conserve fuel and improve the vehicle's operating efficiency. The engine 12 may, for example, be shut off when the vehicle 36 is maintaining a steady cruising speed which may be sustained solely by the torque output of the second motor-generator 30. Additionally, the engine 12 may be shut off when the vehicle 36 is in a coast down mode, i.e., when the vehicle is decelerating from elevated speeds, or when the vehicle is stopped. In a situation when the vehicle 36 is maintaining a steady cruising speed, the engine 12 may, at any moment, be restarted to participate in driving the vehicle 36. In order to participate in driving the vehicle 36, the engine 12 will be called upon to generate an appropriate level of engine torque that will result in a certain level of transmission output torque, i.e., transmission torque at the output member 22.

The level of transmission output torque may be representative of whether the vehicle 36 is to be driven in an electric all-wheel drive mode or in an engine-only drive mode. When the vehicle 36 is to be driven in the electric all-wheel drive mode after the engine restart, the level of torque is determined in response to a request generated by the vehicle's operator. When the vehicle 36 is to be driven in the engine-only drive mode, the second motor-generator 30 may be phased out as the engine 12 is being phased in. Such a situation may develop when the energy supplied to the second motor-generator 30 by the energy storage device 27 is below a predetermined threshold value that is sufficient to operate the second motor-generator 30.

The vehicle 36 also includes a controller 34 that is responsible for regulating one or more components of the vehicle 36. The controller 34 may be, for example, a transmission control module (TCM) operable to control the operation of the transmission 16. As such, the controller 34 is programmed to control the application of fluid pressure required to lock-up individual torque transmitting devices (e.g., first, second, third, and fourth clutches 13, 15, 17, 21) inside the transmission 16 in order to place the transmission into a particular gear ratio. The controller 34 may additionally preform the functions of an engine control unit. For instance, the controller 34 may be configured to control the engine 12 to generate the level of transmission output torque according to whether the vehicle 36 is to be driven in the electric all-wheel drive mode or in the engine-only drive mode. Further, the controller 34 may be an electronic control unit (ECU) configured to regulate and coordinate the hybrid propulsion of the vehicle 36 which includes the operation of the engine 12, the transmission 16, and the first and second motor-generators 24, 30. The controller 34 may be configured to receive a request for the engine to be started when the vehicle 36 is being driven solely via the second motor-generator 30.

The controller 34 may include one or more control modules capable of controlling the operation of engine 12, the first motor-generator 24, the second motor-generator 30, the transmission 16, or a combination thereof. Controls can be employed by the control modules to synchronize the operation of the different devices in order to maintain drivability of the overall powertrain. "Control module," "module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed based on events or at regular intervals.

The controller 34 may also be programmed to determine a desired engine speed and a gear ratio in the transmission 16 according to the level of transmission output torque. For example, the desired speed of the engine 12 and the appropriate gear ratio in the transmission 16 may be selected from a table of mapped data that was gathered during testing and development of the vehicle 36. Such a table of mapped data may also be programmed into the controller 34 in order for the level of transmission output torque to be cross-referenced by the controller against the torque curve of the engine 12, allowable engine speeds, and transmission gear ratios at the present speed of the vehicle 36. Accordingly, the controller 34 may then select the most efficient combination of gear ratio, engine speed, and engine fueling to generate the level of transmission output torque for driving the vehicle 36 in response to the received request for the engine 12 to be restarted. The controller 34 can be in electronic communication with the pressure source 23 and can therefore command the pressure source to turn on or off.

The gear ratio to be selected in the transmission 16 by the controller 34 for generating the transmission output torque requires locking up one or more torque transmitting devices (e.g., first, second, third, and fourth clutches 13, 15, 17, 21). Accordingly, the controller 34 may be programmed to lock-up or fully engage all but one of the transmission torque transmitting devices (e.g., first, second, third, and fourth clutches 13, 15, 17, 21) required to be engaged for selecting the gear ratio. Moreover, the controller 34 is programmed to modulate the engagement of the one remaining torque transmitting device such that a torque capacity of the one remaining torque transmitting device is gradually increased. Modulation of the engagement of the one remaining torque transmitting device may be accomplished by varying pressure of the fluid that is used to actuate the device. Such modulation of the one remaining torque transmitting device serves to adjust the device torque capacity and internal slippage, which, in turn, results in relative motion between the input member 20 and output member 22. Additionally, the controller 34 is programmed to start the engine 12 via the first motor-generator 24 for generating the level of transmission output torque.

The controller 34 is also programmed to control the engine 12 to generate the desired engine speed while the engagement of the one remaining torque transmitting device is being modulated. The modulation of the engagement of the one remaining torque transmitting device may be undertaken together or substantially simultaneously until the desired engine speed has been generated and the speed of the output member 22 is generally equal to the speed of the input 20 divided by the chosen gear ratio. Controlling the engine 12 to generate the desired engine speed may be accomplished by controlling the engine torque output via at least one of regulating the engine fuel rate, retarding engine spark, and regulating the torque of the first motor-generator 24. Typically, retarding an internal combustion engine spark ignites the air-fuel mixture inside the engine cylinders later in the combustion process, which tends to allow less time for the combustion to take place and reduces the engine torque output.

The controller 34 is additionally programmed to regulate the engine 12 and the first motor-generator 24 such that combined torque input from the engine 12 and the first motor-generator to the transmission 16 is approximately zero. Accordingly, during such regulation, the combined torque output of the first motor-generator 24 and the engine 12 is maintained at a level that is substantially equal to the torque required to spin the engine at the desired speed. The controller 34 is additionally programmed to apply the required fluid pressure to thereby lock-up the one remaining torque transmitting device and complete the selection of the chosen gear ratio. Additionally, such locking up of the one remaining torque transmitting device may be accomplished by increasing the fluid pressure to the subject device until substantially all the slip inside the device is eliminated. Therefore, the one remaining torque transmitting device is permitted to be fully locked up by the controller 34 when the engine speed has been substantially synchronized with the speed of the vehicle 36.

Furthermore, the controller 34 is programmed to control the engine 12 to generate the level of transmission output torque. Controlling the engine 12 to generate the level of transmission output torque may be accomplished via regulating engine fuel rate, advancing engine spark, and regulating the torque of the first motor-generator 24. Typically, advancing an internal combustion engine spark ignites the air-fuel mixture inside the engine cylinders earlier in the combustion process, which tends to allow additional time for the combustion to take place and increases the engine torque output.

The vehicle 36 further includes an accelerator pedal 43 that enables a vehicle operator to adjust the position of a throttle (not shown) of the engine 12 to achieve a desired speed. The vehicle 36 further includes an accelerator pedal position sensor 44 capable of generating a pedal position signal indicating a position of the accelerator pedal 43. The accelerator pedal sensor 44 can be in electronic communication with the controller 34. The controller 34 can receive the pedal position signal from the accelerator pedal sensor 44 and can adjust the position of the throttle (not shown) of the engine 12 accordingly, which in turn adjusts the fuel delivery to the engine 12 based on the airflow. The pedal position signal generated by the accelerator pedal sensor 44 is also representative of a power demand PD (FIG. 4) from the vehicle operator.

The vehicle 36 further includes a state of charge (SOC) sensor 29 capable of measuring and determining the SOC of the energy storage device 27. The SOC sensor 29 is in communication (e.g., electronic communication) with the energy storage device 27 and the controller 34. In operation, the SOC sensor 59 can generate a signal indicative of the SOC of the energy storage device 27 (i.e., SOC signal). The SOC signal contains data relating to the SOC of the energy stored device 27. Additionally, the SOC sensor 29 can send the SOC signal to the controller 34. Upon receipt of the SOC signal from the SOC sensor 29, the controller 34 can store the data contained in the SOC signal. The controller 34 can therefore determine the SOC of the energy storage device 27 based on the signal received from the SOC sensor 29.

In addition to the SOC sensor 29, the vehicle 36 includes a vehicle speed sensor 31 in communication (e.g., electronic communication) with the controller 34. The vehicle speed sensor 31 can measure and determine the vehicle speed. In the depicted embodiment, the vehicle speed sensor 31 is operatively coupled to the second axle 28. It is envisioned, however, that the vehicle speed sensor 31 may alternatively be operatively coupled the first axle 18 or a component of the transmission 16 such as the output member 22. Regardless, the vehicle speed sensor 31 can generate a signal indicative of the vehicle speed (i.e., the vehicle speed signal). The signal generated by the vehicle speed sensor 31 contains data about the vehicle speed. In operation, the vehicle speed sensor 31 can send this signal (i.e., the vehicle speed signal) to controller 34. Upon receipt of the vehicle speed signal, the controller 34 can store the data contained in this signal. The controller 34 can therefore determine the vehicle speed based on the signal received from the vehicle speed sensor 31.

Figure 2:
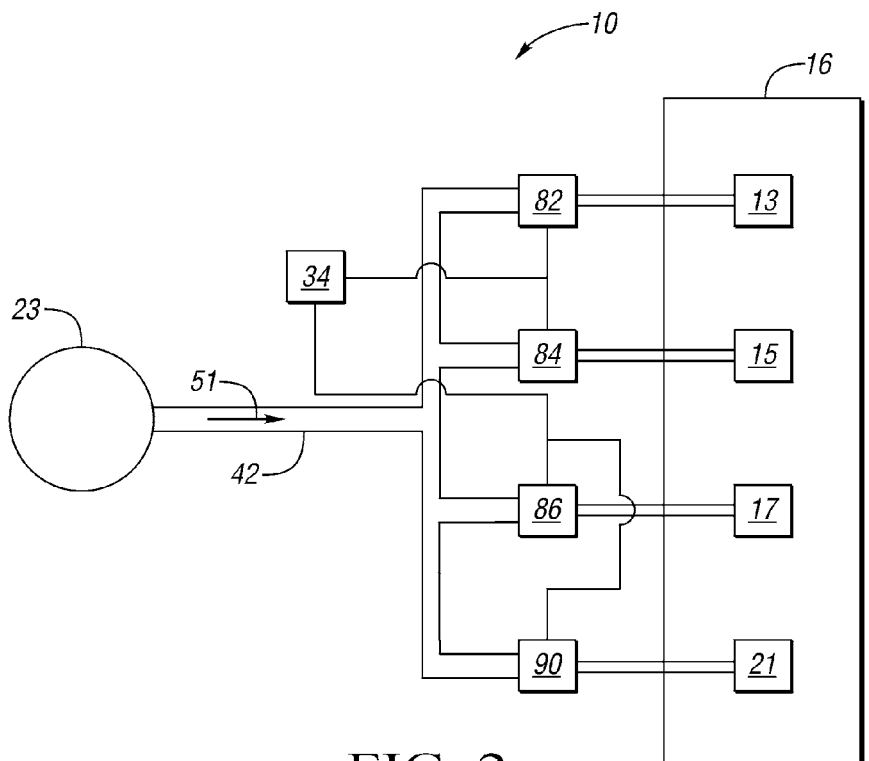
FIG. 2 is a schematic block diagram of a system for controlling a transmission.

With reference to FIGS. 1 and 2, the vehicle 36 includes a system 10 for controlling the automatic transmission 16. The system 10 includes the controller 34 and the pressure source 23 discussed above. In addition, the system 10 includes one or more conduits 42 for transferring transmission fluid 51 from the pressure source 23 to the automatic transmission 16. Accordingly, the automatic transmission 16 is in fluid communication with the pressure source 23. In the depicted embodiment, the first, second, third, and fourth clutches 13, 15, 17, and 21 are in fluid communication with the pressure source 23.

The system 10 further includes a plurality of valves 82, 84, 86, 90 to control the flow of transmission fluid 51 to the first, second, third, and fourth clutches 13, 15, 17, and 21. In the depicted embodiment, the first valve 82 may be a solenoid valve and is disposed in fluid communication with the first clutch 13. As such, the first valve 82 can prevent or allow fluid flow to the first clutch 13. The second valve 84 may be a solenoid valve and is disposed in fluid communication with the second clutch 15. Accordingly, the second valve 84 can prevent or allow fluid flow to the second clutch 15. The third valve 86 may be a solenoid valve and is disposed in fluid communication with the third clutch 17. Thus, the third valve 86 can prevent or allow fluid flow to the third clutch 17. The fourth valve 90 may be a solenoid valve and is disposed in fluid communication with the fourth clutch 21. Therefore, the fourth valve 90 can prevent or allow fluid flow to the fourth clutch 21.

The first, second, third, and fourth vales 82, 84, 86, and 90 are in communication with the controller 34. For example, the controller 34 may be in electronic communication with the first, second, third, and fourth valves 82, 84, 86, and 90 via a suitable wired or wireless network. Accordingly, the controller 34 can control the operation of the first, second, third, and fourth vales 82, 84, 86, and 90.

With reference to FIG. 3, the clutch 13 may be a hydraulic clutch. In the interest of brevity, only the first clutch 13 is described in detail. However, the second, third and fourth clutches 15, 17, 21 may be identical or substantially similar to the first clutch 13. In the depicted embodiment, the first clutch 13 includes a housing 426 and a piston 422 slidably disposed inside the housing 426. The housing 426 defines a chamber 424 (also referred to herein as "apply chamber"). The piston 422 is slidably disposed in the chamber 424. The chamber 424 may be in direct fluid communication with the valve 82 (FIG. 2) by a clutch feed path, which is defined at least partially by the conduit 42. The piston 422 is urged into a disengaged position (as seen in FIG. 3) by a biasing member, shown as return spring 430. Specifically, the return spring 430 biases the piston 422 in a first direction indicated by arrow A toward the disengaged position or state. The first clutch 13 also includes a plurality of friction plates 432 drivingly connected with or splined to a shaft 438. Each friction plate 432 has a coating or layer of friction material 434. The friction plates 432 are interspersed with a plurality of reaction plates 436 that are drivingly connected with or splined to the housing 426. The friction and reaction plates 432, 436 cooperate to form a conventional clutch pack.

The first clutch 13 is shown in FIG. 3 in a disengaged state, wherein the fluid pressure in the chamber 424 is essentially zero. During operation of the first clutch 13, transmission fluid 51 will be rapidly distributed from the pressure source 23 into the chamber 424 via the valve 82. When the pressure in the chamber 424 is sufficient to overcome the force of return spring 430, the piston 422 is urged into an engaged position or state, translating axially to push against the friction and reaction plates 432, 436, thereby frictionally engaging the adjacent faces of the friction and reaction plates 432, 436. Specifically, when sufficient pressurized transmission fluid 51 is transferred into the chamber 424, the piston 422 moves in the direction indicated by arrow B toward the engaged position. Eventually, the piston 422 pushes against the friction and reaction plates 432, 436. At this point, the first clutch 13 is in the engaged position or state. In the engaged position or state, the first clutch 13 can transfer torque. As the pressure inside the chamber 424 is increased, the piston 422 will compress the friction and reaction plates 432, 436, drivingly connecting the shaft 438 with the piston housing 426. At full engagement, the valve 82 can regulate the pressure within the piston chamber 424 to maintain the first clutch 13 engaged at the desired torque level.

The first clutch 13 shown in FIG. 3 is an exemplary clutch, provided to aid in understanding some key features and parameters of the present disclosure. To this regard, the first clutch 13 may take on any known configuration without departing from the intended scope and spirit of the present disclosure. By way of example, and not limitation, the first clutch 13 may be a reaction clutch assembly (e.g., wherein the housing 426 is integral with or attached to a stationary member, generally a portion of the transmission housing, to ground the shaft 438 upon engagement of piston 422), or a rotating clutch assembly (e.g., wherein the housing 426 is integral with or attached to a driven element, such as a constituent part of an epicyclic planetary gear set, to drivingly transfer torque thereto from the shaft 438 upon engagement of piston 422).

During operation of the automatic transmission 16 (FIG. 1), each shift from one speed ratio (or gear ratio) to another includes an active "fill" phase or event during which the chamber 424 of at least one clutch (e.g., first, second, third, and fourth clutches 13, 15, 17, and 21) is filled with pressurized transmission fluid 51 in preparation for torque transmission. The pressurized transmission fluid 51 compresses return spring 430, thereby moving the piston 422 in the direction indicated by arrow B. Once the piston chamber 424 is sufficiently filled, the piston 422 applies a force to the friction and reaction plates 432, 436 in the direction of arrow B, thus developing a torque capacity exceeding the return force of the return spring 430. Thereafter, the first clutch 13 may transmit torque in relation to pressure in the piston chamber 424, and the entire shift event may be completed using various control strategies and methodologies. The volume of transmission fluid 51 required to sufficiently fill a clutch through the clutch fill event, and to stroke the return spring 430 and thereby cause the clutch 13 to sufficient gain torque capacity, is typically referred to as the "clutch volume". The amount of time required for completing the fill event is referred to as the "fill time."

With reference to FIG. 4, the method 100 for controlling the automatic transmission 16 (FIG. 1). The method 100 can be used to minimize the time it takes to transfer torque from the internal combustion engine 12 to the first axle 18 of the vehicle 36 during a flying engine start by staging at least one of the clutches (e.g., clutches 13, 15, 17, or 21) before the flying engine start is initiated. As used herein, the term "staging" means holding a clutch at a desired position or pressure threshold. This pressure threshold may be, for example, equal to or less than the pressure at which the clutch (e.g., clutches 13, 15, 17, or 21) can transfer torque.

The method 100 begins with step 102. Step 102 entails determining, via the controller 34, a speed of the vehicle 36 (i.e., the vehicle speed) while the vehicle 36 is solely driven by at least one electric motor-generator such as the first or second electric motor-generator 24, 30. As discussed above, the controller 34 can determine the vehicle speed based on the signal received from the vehicle speed sensor 31. The method 100 then continues to step 104.

Step 104 entails determining, via the controller 34, the power demand from the vehicle operator. The controller 34 can determine the power demand from the vehicle operator based on the signal received from the accelerator pedal position sensor 44. Alternatively, the controller 34 may determine the power demand from the vehicle operation based on the position of a throttle (not shown) of the vehicle 36. In this case, the vehicle 36 includes a sensor (not shown) capable of detecting the position of the throttle. After determining the power demand from the vehicle operator, the method 100 continues to step 106.

Step 106 entails determining, via the controller 34, the state of charge of the energy storage device 27. The controller 34 can determine the state of charge of the energy storage device 27 based on signals received from the SOC sensor 29. The method 100 then proceeds to step 108.

Step 108 entails determining, via the controller 34, an initial speed ratio (e.g., an initial gear ratio) based on the vehicle speed determined in step 102, the power demand determined in step 104, and the state of charge of the energy storage device 27. As discussed above, the speed ratio may be a gear ratio. Accordingly, step 108 may entail determining an initial gear ratio based on the vehicle speed determined in step 102, the power demand determined in step 104, and the state of charge of the energy storage device 27. To determine the initial speed ratio, the method 100 may employ one or more shift maps, such as the gear shift map 200 shown in FIG. 5, stored in the controller 34. For example, the gear shift map 200 employed may depend on the state of charge of the energy storage device 27. That is, the state of charge of the energy storage device 27 determined in step 106 may be used to select the appropriate gear shift map 200. As discussed above, certain clutches (e.g., first, second, third and fourth clutches 13, 15, 17, or 21) should be fully applied to select a specific gear ratio in the automatic transmission 16. Accordingly, step 108 also entails determining the clutches e.g., first, second, third and fourth clutches 13, 15, 17, or 21) that should be fully applied to select the initial gear ratio in the automatic transmission 16. The clutches that should be applied to achieve the initial gear ratio may be referred to as the initial clutches.

Figure 5:
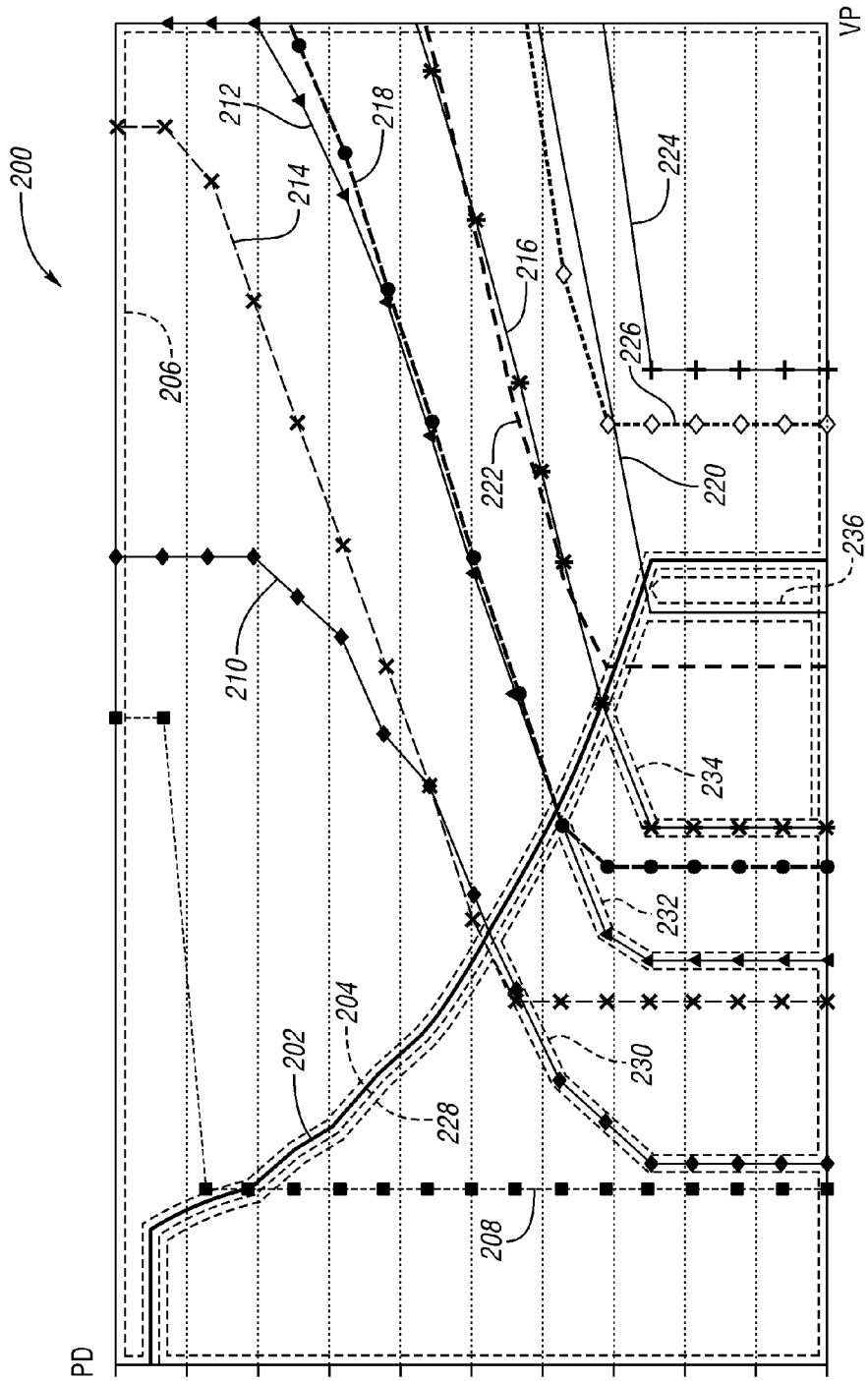
FIG. 5 is a graph illustrating a gear shift map, wherein the horizontal axis represents a vehicle speed and the vertical axis represents a power demand from a vehicle operator.

With reference to FIG. 5, a gear shift map 200 includes a horizontal axis representing vehicle speed VP and a vertical axis representing a power demand from a vehicle operator PD. Alternatively, the vertical axis of the gear shift map 200 may represent throttle position. The automatic transmission 16 can use the gear shift map 200 to determine the points at which an upshifting and downshifting is appropriate based on the vehicle speed VP and the power demand PD from the vehicle operator.

The gear shift map 200 includes an EV transition trace 202 that divides the gear shift map 200 into an EV mode area 204 and an Engine On area 206. In the EV mode area 204, the vehicle 36 is solely driven by an electric motor-generator such as the second electric motor-generator 30. In the Engine On area 206, the vehicle 36 is driven by the internal combustion engine 12 and at least one of the first and second electric motor-generator 24, 30. The position of the EV transition trace 202 in the gear shift map 200 may depend on the state of charge of the energy storage device 27. The entire gear shift map 200 may be generated by testing the vehicle 36 or through simulation.

With continued reference to FIG. 5, the gear shift map 200 further includes a plurality of upshift and downshift traces that define points at which an upshifting and downshifting is appropriate based on the vehicle speed VP and the power demand from the vehicle operator.

In the depicted embodment, the gear shift map 200 includes a first downshift trace 208 and a first upshift trace 210. The first upshift trace 210 defines the points at which the automatic transmission 16 should shift from a first gear ratio to a second gear ratio. The first downshift trace 208 defines the points at which the automatic transmission 16 should shift from the second gear ratio to the first gear ratio.

The gear shift map 200 further includes a second upshift trace 212 and a second downshift trace 214. The second upshift trace 212 defines the points at which the automatic transmission 16 should shift from the second gear ratio to a third gear ratio. The second downshift trace 214 defines the points at which the automatic transmission 16 should shift from the third gear ratio to the second gear ratio.

The gear shift map 200 includes a third upshift trace 216 and a third downshift trace 218. The third upshift trace 216 defines the points at which the automatic transmission 16 should shift from the third gear ratio to a fourth gear ratio. The third downshift trace 218 defines the points at which the automatic transmission 16 should shift from the fourth gear ratio to the third gear ratio.

In addition, the gear shift map 200 includes a fourth upshift trace 220 and fourth downshift trace 222. The fourth upshift trace 220 defines the points at which the automatic transmission 16 should shift from the fourth gear ratio to a fifth gear ratio. The fourth downshift trace 222 defines the points at which the automatic transmission 16 should shift from the fifth gear ratio to the fifth gear ratio.

The gear shift map 200 includes a fifth upshift trace 224 and a fifth downshift trace 226. The fifth upshift trace 224 defines the points at which the automatic transmission 16 should shift from the fifth gear ratio to a sixth gear ratio. The fifth downshift trace 226 defines the points at which the automatic transmission 16 should shift from the sixth gear ratio to the fourth gear ratio.

Within the EV mode area 204, the gear shift map 200 defines a plurality of gear stage areas. The term "gear stage areas" are the areas where the clutches that are necessary to achieve a specific gear ratio should be staged while the vehicle 36 is solely driven by an electric motor-generator (e.g., second electric motor-generator 30) in order to minimize the time it takes for the automatic transmission 16 to transfer torque from the internal combustion engine 12 to an axle, such as the first axle 18, during a flying engine start. As discussed above, a clutch is staged when it is held at a desired position or pressure threshold. This pressure threshold may be, for example, equal to or less than the pressure at which the clutch (e.g., clutches 13, 15, 17, or 12) can transfer torque.

In FIG. 5, the gear shift map 200 includes a first gear stage area 228 delimited by the vertical axis (i.e., the power demand PD axis), horizontal axis (i.e., vehicle speed VP axis), EV transition trace 202, and first upshift trace 210. When the vehicle 36 is operating in the first gear stage area 228, the clutches (e.g., first, second, third and fourth clutches 13, 15, 17, or 21) that must be fully applied to select the first gear ratio in the automatic transmission 16 should be staged.

The gear shift map 200 further includes a second gear stage area 230 delimited by the vertical axis (i.e., the power demand PD axis), horizontal axis (i.e., vehicle speed VP axis), EV transition trace 202, first upshift trace 210, and second upshift trace 212. When the vehicle 36 is operating in the second gear stage area 230, the clutches (e.g., first, second, third and fourth clutches 13, 15, 17, or 21) that must be fully applied to select the second gear ratio in the automatic transmission 16 are the clutches that should be staged.

The gear shift map 200 additionally includes a third gear stage area 232 delimited by the vertical axis (i.e., the power demand PD axis), horizontal axis (i.e., vehicle speed VP axis), EV transition trace 202, second upshift trace 212, and third upshift trace 216. When the vehicle 36 is operating in the third gear stage area 232, the clutches (e.g., first, second, third and fourth clutches 13, 15, 17, or 21) that must be fully applied to select the third gear ratio in the automatic transmission 16 are the clutches that should be staged.

Further, the gear shift map 200 includes a fourth gear stage area 234 delimited by the vertical axis (i.e., the power demand PD axis), horizontal axis (i.e., vehicle speed VP axis), EV transition trace 202, third upshift trace 216, and fourth upshift trace 220. When the vehicle 36 is operating in the fourth gear stage area 234, the clutches (e.g., first, second, third and fourth clutches 13, 15, 17, or 21) that must be fully applied to select the third gear ratio in the automatic transmission 16 are the clutches that should be staged.

The gear shift map 200 includes a fifth gear stage area 236 delimited by the vertical axis (i.e., the power demand PD axis), horizontal axis (i.e., vehicle speed VP axis), EV transition trace 202, and fourth upshift trace 220. When the vehicle 36 is operating in the fourth gear stage area 234, the clutches (e.g., first, second, third and fourth clutches 13, 15, 17, or 21) that must be fully applied to select the fifth gear ratio in the automatic transmission 16 are the clutches that should be staged.

As discussed above, step 108 also entails determining the initial gear ratio based on the gear shift map 200. As stated above, the controller 34 can determine the initial gear ratio based on the gear shift map 200. By determining the initial gear ratio, the controller 34 can correspondingly determine the group of clutches e.g., first, second, third and fourth clutches 13, 15, 17, or 21) that must be fully applied to select the initial gear ratio in the automatic transmission 16. Accordingly, step 108 includes determining the initial group of clutches (e.g., first group of clutches 25 or second group of clutches 33) that should be staged while the vehicle 36 is solely driven by an electric motor-generator, such as the second electric motor-generator 30, in order to minimize the time it takes to transfer torque from the internal combustion engine 12 to an axle, such as the first axle 18, during a flying engine start. At step 108, the controller 34 can determine the initial group of clutches based on the gear shift map 200. For example, if the vehicle 36 is traveling at a certain vehicle speed VP and the vehicle operator is requesting certain power demand PD, the controller 34 may determine that the first gear ratio of the automatic transmission 16 should be selected based on the gear shift map 200. Accordingly, the controller 34 identifies the group of clutches (e.g., first group of clutches 25 or second group of clutches 33) that are needed to select the first gear ratio as the group of clutches that should be staged. Once the initial gear ratio is determined, the method 100 continues to step 110.

Step 110 entails determining a target gear ratio based, at least in part, on the initial gear ratio determined in step 108. In addition, step 110 includes determining the clutches (i.e., the target clutches) that should be fully applied to select the target gear ratio in the automatic transmission 16. It is contemplated that the target gear ratio may be the same as the initial gear ratio. To perform the step 110, the controller 34 can execute the method 300 shown in FIG. 6. As discussed below in detail, step 110 entails With reference to FIG. 6, the method 300 begins at step 302. Step 302 entails selecting or identifying, via the controller 34, a plurality of potential gear ratios to be staged based on the initial gear ratio determined in step 108 of the method 100. Thus, the controller 34 can select a plurality of potential gear ratios based on the initial gear ratio determined in step 108 of the method 100. The potential gear ratios include the initial gear ratio determined in step 108 of the method 100 and gear ratios that are adjacent to the determined initial gear ratio. The plurality of potential gear ratios may consist of two gear ratios that are higher than the initial gear ratio and two gear ratios that are lower than the initial gear ratio. For example, if the initial gear ratio is the third gear ratio, the plurality of potential gear ratios may consist of the first, second, fourth and fifth gear ratios. Alternatively, the plurality of potential gear ratios may consist of a gear ratio that is higher than the initial gear ratio and another gear ratio that is lower than the initial gear ratio. For instance, if the initial gear ratio is the fourth gear ratio, the plurality of potential gear ratios may be the third and fifth gear ratios. Once the potential gear ratios are selected by the controller 34, the method 300 continues to step 304.

Step 304 entails determining, via the controller 34, the clutches (e.g., first, second, third, and fourth clutches 13, 15, 17, 21) that should be fully applied to select each of the potential gear ratios identified in step 302. Thus, the controller 34 determines which clutches or group of clutches (e.g., first group of clutches 25 or second group of clutches 33) which are necessary to achieve the potential gear ratios identified in step 302. For example, if the first, second, and third gear ratios are identified as potential gear ratios in step 302, the controller 34 then determines which clutches should be fully applied to achieve each of the first, second, and third gear ratios. The clutches identified in step 304 may be referred to as potential clutches. Once the potential clutches are identified, the method 300 proceeds to step 306.

Step 306 entails determining, via the controller 34, the temperature of the transmission fluid 51 (FIG. 2). The controller 34 can determine the transmission fluid temperature based on the signal received from the temperature sensor 19 (FIG. 1). Once the transmission fluid temperature is determined, the controller 34 continues to step 308.

Step 308 entails determining, via the controller 34, which of the potential clutches (e.g., first, second, third, or fourth clutches 13, 15, 17, 21) has the largest fill time in order to identify one or more target clutches. As discussed above, the term "fill time" means the amount of time it takes a clutch to reach a threshold. This threshold may be based at least in part on piston position, clutch volume, and/or clutch pressure. As a non-limiting example, the term "fill time" may refer to the amount of the time it takes a clutch to fill with transmission fluid in order to shift from a disengaged state to an engaged state when the clutch receives transmission fluid at a constant flow rate. In the disengaged position or state, the clutch does not transfer torque, whereas, in the engaged position, the clutch can transfer torque. Transmission fluid 51 (FIG. 2) can be supplied to a clutch (e.g., first, second, third, or fourth clutches 13, 15, 17, 21) to shift said clutch from the disengaged position to the engaged position. When the clutch is filled with transmission fluid 51, the clutch is in the engaged position. The "fill time" of the clutch may therefore depend on the conditions of the transmission fluid, such as the transmission fluid temperature, and the hydraulic characteristics of the clutch such as clutch volume, orifice size, clutch geometry, return spring characteristics, among others. The fill times of the potential clutches determined in step 304 may be obtained from a lookup table stored in the controller 34. Such fill times may be derived by testing the automatic transmission 16 or through simulation. At step 308, the controller 34 may determine, for example, that the second clutch 15 has the largest fill time. After determining which of the potential clutches has the largest fill time (i.e., identifying the target clutches), method 300 continues to step 310.

Step 310 entails determining, via the controller 34, determining which gear ratios utilize the clutch or clutches (i.e., the target clutches identified in step 308) with the largest fill time as determined in step 308 in order to identify a target gear ratio. In other words, step 310 entails determining the target gear ratio based at least in part on the one or more target clutches identified in step 308. For example, the controller 34 can determine that the second and third gear ratios use the clutch that has the largest fill time (i.e., the target clutch). To do so, a lookup table may be stored in the controller 34 that contains the list of the clutches utilized to achieve each gear ratio of the automatic transmission 16. The gear ratios that use the clutch with the largest fill time may be referred to as the feasible gear ratios. After determining the feasible gear ratios, the method 300 continues to step 312.

Step 312 entails determining, via the controller 34, which of the feasible gear ratios determined in step 310 takes the longest amount of time to achieve, based on the fill times of the clutches used to achieve each feasible gear ratio, in order to determine a target gear ratio. In other words, at step 312, the controller 34 determines which of the feasible gear ratios determined in step 310 takes the longest amount of time to achieve in order to determine a target gear ratio. To do so, the controller 34 may determine the fill times of the clutches (i.e., the potential clutches) used to achieve each feasible gear ratio. A common clutch is used to achieve each feasible gear ratio determined in step 310. Thus, at step 312, the controller 34 only needs to determine the fill times of the clutches not commonly used to achieve each feasible gear ratio determined in step 310. Then, the controller 34 can compare the fill times of the clutches not commonly used to achieve each feasible gear ratio in order to determine which of the feasible gear ratios would take the longest amount of time to achieve (i.e., the target gear ratio). As discussed above, the fill time of a clutch may depend on the conditions of the transmission fluid, such as the transmission fluid temperature, and the hydraulic characteristics of the clutch such as clutch volume, orifice size, clutch geometry, return spring characteristics, among others things. By taking into account the fill times of the clutches used to achieve each feasible gear ratio, the controller 34 can determine which of the feasible gear ratios would take the longest amount of time to achieve. The feasible gear ratio that the takes longest time to achieve is then determined. The feasible gear ratio that the takes longest time to achieve may be referred to as the target gear ratio. Once the target gear ratio is determined, the method 300 ends, and the method 100 can continue to step 112.

With reference again to FIG. 4, step 112 entails determining, via the controller 34, how much transmission fluid 51 (FIG. 2) to provide to the clutches that are necessary to achieve the target gear ratio determined in step 110. As discussed above, the method 300 shown in FIG. 4 can be used to determine the target gear ratio. At step 112, the controller 112 can determine the pressure in the clutches that is used to select the target gear ratio. In other words, the controller 34 determines a pressure threshold for each clutch needed to select the target gear ratio. The pressure threshold for each clutch may be obtained from data sets stored in the controller 34 and may be equal to or less than the pressure necessary to fully apply the respective clutch. As discussed above, a fully applied clutch can transfer torque. Moreover, the pressure threshold may depend on the power flow of automatic transmission 16 for the target gear ratio selected in step 110. The term "power flow" means a flow of power through the gear sets of the automatic transmission 16. After determining the pressure threshold for each clutch needed to select the target gear ratio, the method 100 continues to step 114.

Step 114 entails turning on the pressure source 23 (FIG. 2) in order to begin transferring transmission fluid 51 from the clutches that are used to select the target gear ratio (i.e., the target clutches). To do so, the controller 34 can send a command (i.e., an activation command) to the pressure source 23. In other words, step 114 includes sending an activation command to the pressure source 23 in order to turn on the pressure source 23. Upon receipt of the activation command from the controller 34, the pressure source 23 turns on. After the pressure source 23 is on, the method 100 continues to step 116.

Step 116 entails transferring transmission fluid 51 to the clutches (e.g., clutches 13, 15, 17, or 21) that are used to select the target gear ratio (i.e., the target clutches) by controlling the appropriate valves (e.g., valves 82, 84, 86, 90). For example, if the first and second clutches 13 and 15 should be applied to select the target gear ratio determined in step 110, the controller 34 can send pressure commands to the first and second valves 84 in order to allow the transmission fluid 51 to flow into the first and second clutches 13 and 15. Step 116 therefore includes sending pressure commands to the valves (e.g., valves 82, 84, 86, 90) that are in fluid communication with the clutches that are used to select the target gear ratio. Upon receipt of the pressure commands, the valves (e.g., valves 82, 84, 86, 90) open, thereby allowing the transmission fluid 51 to flow to the corresponding clutches. Hence, step 116 entails transferring sufficient transmission fluid 51 to the target clutches (see step 114) to reach a pressure threshold (see step 112) in the target clutches in order to minimize the time necessary to transfer torque from the internal combustion engine 12 to the axle 18 through the automatic transmission 16 the internal combustion 12 is started. After transferring transmission fluid 51 to the clutches (e.g., clutches 13, 15, 17, or 21) that are used to select the target gear ratio, the method continues to step 118.

Step 118 entails sending, via the controller 34, a message to other vehicle controllers, such as the Engine Control Module (ECM) and the Brake Control Module (BCM), that the staging process has been completed. Thus, the controller 34, which may be a TCM, can send a message to other vehicle controllers, indicating that the method 100 has been completed. As discussed above, the controller 34 may include more than one control module. For example, the controller 34 may include a TCM and ECM. In such a case, step 118 entails at least one communication within the controller 34. For instance, step 118 may include sending a message that the staging process has been completed from the TCM of the controller 34 to the ECM of the controller 34. At this point, when the internal combustion engine 12 starts while the vehicle 36 is solely driven by the electric motor-generator, such as the second electric motor-generator 30, the time it takes to transfer torque from the internal combustion engine 12 to an axle, such as the first axle 18, via the automatic transmission 16, is minimized because clutches necessary to achieve the target gear ratio are at least partially filled with transmission fluid 51.

The detailed description and the drawings or figures are supportive and descriptive of the invention, but the scope of the invention is defined solely by the claims. As used herein, the phrase at least one of A and B should be construed to mean a logical (A or B), using a non-exclusive logical or. While some of the best modes and other embodiments for carrying out the claimed invention have been described in detail, various alternative designs and embodiments exist for practicing the invention defined in the appended claims.

The invention claimed is:

1. A method of controlling an automatic transmission of a vehicle, the vehicle including a controller, an internal combustion engine operatively coupled to the automatic transmission, an axle operatively coupled to the automatic transmission, and an electric motor-generator, the method comprising:

determining, via the controller, an initial gear ratio of the automatic transmission based on a gear shift map while the vehicle is being solely driven by the electric motor-generator;

identifying a plurality of potential clutches of the automatic transmission based on the initial gear ratio, each of the potential clutches being configured to shift between a disengaged state and an engaged state, each of the potential clutches having a fill time;

determining a temperature of the transmission fluid;

determining which of the potential clutches has a largest fill time based at least in part on the temperature of the transmission fluid in order to identify at least one of a plurality of target clutches;

determining, via the controller, a target gear ratio of the automatic transmission based on the at least one identified target clutch; and before starting the internal combustion engine, transferring sufficient transmission fluid to the at least one identified target clutch to reach a pressure threshold in the at least one identified target clutch in order to minimize a time necessary to transfer torque from the internal combustion engine to the axle through the automatic transmission once the internal combustion engine is started.

2. The method of claim 1, further comprising determining a vehicle speed, wherein the initial gear ratio is based on the vehicle speed.

3. The method of claim 2, further comprising determining a power demand from a vehicle operator, wherein the initial gear ratio is based on the power demand from the vehicle operator.

4. The method of claim 3, further comprising determining a state of charge of an energy storage device, the energy storage device being configured to supply electrical energy to the electric motor-generator.

5. The method of claim 1, further comprising identifying gear ratios of the automatic transmission that use the potential clutch with the largest fill time in order to identify feasible gear ratios of the automatic transmission.

6. The method of claim 5, further comprising determining fill times of the potential clutches used to select each of the feasible gear ratios.

7. The method of claim 6, further comprising determining which of the feasible gear ratios takes a longest time to achieve based on the fill times of the potential clutches used to select each of the feasible gear ratios in order to determine the target gear ratio.

8. The method of claim 1, turning on a pressure source that is in fluid communication with the target clutches after determining the target gear ratio.

9. A system for controlling an automatic transmission of a vehicle, the vehicle including an internal combustion engine operatively coupled to the automatic transmission, an axle operatively coupled to the automatic transmission, and an electric motor-generator, the automatic transmission including a plurality of clutches, the system comprising:

a pressure source;

a plurality of valves, each valve being in fluid communication with the pressure source and at least one of the clutches; and a controller in electronic communication with the pressure source and the plurality of valves, the controller being configured to:

determine an initial gear ratio of the automatic transmission based on a gear shift map while the vehicle is solely driven by the electric motor-generator;

identify potential clutches of the plurality of clutches based on the initial gear ratio, each of the potential clutches being configured to shift between a disengaged state and an engaged state, each of the potential clutches having a fill time;

determine a temperature of the transmission fluid;

determine which of the potential clutches has a largest fill time based at least in part on the temperature of the transmission fluid in order to identify at least one of a plurality of target clutches;

determine a target gear ratio of the automatic transmission based on the at least one identified target clutch; and send an activation command to the pressure source to turn on the pressure source; and before the internal combustion engine is started, send pressure commands to the valves that are in fluid communication with the potential clutches used to select the target gear ratio in order to transfer sufficient transmission fluid to the at least one target clutch to reach a pressure threshold in the target clutches in order to minimize a time necessary to transfer torque from the internal combustion engine to the axle through the automatic transmission once the internal combustion engine is started.

10. The system of claim 9, wherein the controller is configured to determine a vehicle speed, and the initial gear ratio is based on the vehicle speed.

11. The system of claim 10, wherein the controller is configured to determine a power demand from a vehicle operator, and the initial gear ratio is based on the power demand from the vehicle operator.

12. The system of claim 9, wherein the controller is configured to determine a state of charge of an energy storage device, and the energy storage device being configured to supply electrical energy to the electric motor-generator.

13. The system of claim 9, wherein the controller is configured to identify gear ratios of the transmission that use the potential clutch with the largest fill time in order to identify feasible gear ratios of the transmission.

14. The system of claim 13, wherein the controller is configured to determine fill times of the potential clutches used to select each of the feasible gear ratios.

15. The system of claim 14, wherein the controller is configured to determine which of the feasible gear ratios takes a longest time to achieve based on the fill times of the potential clutches used to select each of the feasible gear ratios in order to determine the target gear ratio.

16. A vehicle, comprising:

an automatic transmission including a plurality of clutches, each of the clutches being configured to shift between a disengaged state and an engaged state, each of the clutches having a fill time;

an internal combustion engine operatively coupled to the automatic transmission;

a first axle operatively coupled to the internal combustion engine and the automatic transmission;

a second axle;

an electric motor-generator operatively coupled to the second axle;

a pressure source in fluid communication with the plurality of clutches;

a plurality of valves, each valve being in fluid communication with the pressure source and at least one of the clutches; and a controller in electronic communication with the pressure source and the plurality of valves, the controller being configured to:

determine an initial gear ratio of the transmission based on a gear shift map while the vehicle is solely driven by the electric motor-generator;

identify potential clutches of the plurality of clutches based on the initial gear ratio;

determine a temperature of the transmission fluid;

determine which of the potential clutches has a largest fill time based at least in part on the temperature of the transmission fluid in order to identify at least one of a plurality of target clutches;

determine a target gear ratio of the transmission based on the at least one identified target clutch; and send an activation command to the pressure source to turn on the pressure source; and before the internal combustion engine is started, send pressure commands to the valves that are in fluid communication with the potential clutches used to select the target gear ratio in order to transfer sufficient transmission fluid to the at least one identified target clutch to reach a pressure threshold in the at least one identified target clutch to thereby minimize a time necessary to transfer torque from the internal combustion engine to the first axle through the automatic transmission once the internal combustion engine is started.

17. The vehicle of claim 16, wherein the controller is configured to determine a vehicle speed, and the initial gear ratio is based on the vehicle speed.

18. The vehicle of claim 17, wherein the controller is configured to determine a power demand from a vehicle operator, and the initial gear ratio is based on the power demand from the vehicle operator.

19. The vehicle of claim 18, wherein the controller is configured to determine a state of charge of an energy storage device, and the energy storage device being configured to supply electrical energy to the electric motor-generator.

20. The vehicle of claim 19, wherein the controller is configured to identify gear ratios of the transmission that use the potential clutch with the largest fill time in order to identify feasible gear ratios of the transmission.

* * * * *